US012767034B2

(12) United States Patent
Kuroi

(10) Patent No.: US 12,767,034 B2
(45) Date of Patent: Oct. 20, 2026

(54) LOCKING MECHANISM

(71) Applicant: NHK SPRING CO., LTD., Yokohama (JP)

(72) Inventor: Shigeru Kuroi, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 427 days.

(21) Appl. No.: 18/485,711

(22) Filed: Oct. 12, 2023

(65) Prior Publication Data

US 2024/0034219 A1 Feb. 1, 2024

Related U.S. Application Data

(63) Continuation of application No. PCT/JP2022/017793, filed on Apr. 14, 2022.

(30) Foreign Application Priority Data

Apr. 15, 2021 (JP) ................................. 2021-069207

(51) Int. Cl.
*B60P 7/08* (2006.01)
*B60P 3/10* (2006.01)
*E05B 85/24* (2014.01)

(52) U.S. Cl.
CPC ........... *B60P 7/0807* (2013.01); *B60P 3/1066* (2013.01); *E05B 85/243* (2013.01)

(58) Field of Classification Search
CPC ............................ B60P 7/0807; B60P 3/1066; Y10T 292/1047; Y10T 292/1075; Y10T 292/1076; Y10T 292/108; Y10T 292/1039; Y10T 292/288; Y10T 292/296; Y10T 292/558; Y10T 292/696; Y10T 292/702;
(Continued)

(56) References Cited

U.S. PATENT DOCUMENTS 2,522,951 A * 9/1950 Knox ........................ B60D 1/26
280/509
3,410,600 A * 11/1968 Thorpe ...................... E05C 3/24
297/378.13
(Continued)

FOREIGN PATENT DOCUMENTS

CA 2430321 C * 2/2008 ............. B63C 13/00
DE 29615132 U1 * 12/1996 ............... B60N 2/20
(Continued)

OTHER PUBLICATIONS

Extended European Search Report (EESR) dated Mar. 24, 2025, issued in counterpart European Application No. 22788203.2.
(Continued)

*Primary Examiner* — Steven A Tullia
(74) *Attorney, Agent, or Firm* — Holtz, Holtz & Volek PC

(57) ABSTRACT

A locking mechanism includes a base with a notch, a latching member with a hook and a first receiving surface, and a locking member with a lever and a regulation portion. The latching member is rotatable between an engagement position and an engagement release position. The locking member is rotatable between a lock position and an unlock position. The regulation portion does not interfere with the latching member when the locking member is rotated from the lock position toward the unlock position.

7 Claims, 10 Drawing Sheets

(58) Field of Classification Search
CPC ......... Y10T 292/0886; Y10T 292/0887; E05B 85/04; E05B 85/045; E05B 85/243; E05B 17/2007; E05B 17/2058; E05B 17/2049; E05B 17/208; E05B 2063/0026; E05B 65/0007; E05B 65/0046; E05C 3/24; B60N 2/01583; B60N 2/366
See application file for complete search history.

(56) References Cited

U.S. PATENT DOCUMENTS

| | | | | | |
|---|---|---|---|---|---|
| 3,963,263 | A * | 6/1976 | Whitlock | B63B 21/00 | 280/414.1 |
| 3,985,381 | A * | 10/1976 | Kobayashi | E05B 83/16 | 292/216 |
| 4,073,519 | A * | 2/1978 | Kurozu | E05B 85/243 | 292/216 |
| 4,703,961 | A * | 11/1987 | Weinerman | E05C 3/24 | 292/216 |
| 4,765,682 | A * | 8/1988 | Satoh | B60N 2/20 | 297/378.13 |
| 5,116,090 | A * | 5/1992 | Nichandros | E05C 3/16 | 292/DIG. 60 |
| 5,286,073 | A * | 2/1994 | Ui | E05C 17/50 | 292/216 |
| 5,738,393 | A * | 4/1998 | Chao | E05B 83/24 | 292/216 |
| 5,876,166 | A * | 3/1999 | Hyslop | B60P 3/1075 | 410/86 |
| 6,454,321 | B1 * | 9/2002 | Parikh | E05C 3/24 | 292/216 |
| 6,471,260 | B1 * | 10/2002 | Weinerman | E05C 3/24 | 292/216 |
| 7,066,549 | B2 * | 6/2006 | Dennon | A61G 5/10 | 297/378.13 |
| 7,575,280 | B2 * | 8/2009 | Palomba | B60N 2/01583 | 297/336 |
| 7,740,317 | B2 * | 6/2010 | Yamada | B60N 2/366 | 297/378.13 |
| 7,762,605 | B2 * | 7/2010 | Otsuka | B60N 2/01583 | 297/378.13 |
| 7,954,898 | B2 | 6/2011 | Van et al. | | |
| 8,459,516 | B2 * | 6/2013 | O'Regan | G09F 7/18 | 224/555 |
| 8,678,451 | B2 * | 3/2014 | Martin | E05C 3/14 | 292/210 |
| 9,340,141 | B1 * | 5/2016 | Downs | B60P 3/1066 | |
| 9,500,012 | B2 * | 11/2016 | Yamazaki | E05C 19/12 | |
| 9,546,503 | B2 * | 1/2017 | Krueger | E05B 47/06 | |
| 10,385,597 | B2 * | 8/2019 | Siebert | E05C 19/026 | |
| 11,273,749 | B2 * | 3/2022 | Quandt | B60P 3/1066 | |
| 2004/0037686 | A1 * | 2/2004 | Zietlow | B60P 3/1066 | 414/559 |
| 2005/0206172 | A1 * | 9/2005 | Bacon | E05B 17/0004 | 292/216 |
| 2006/0006668 | A1 * | 1/2006 | Hidding | E05B 85/243 | 292/216 |
| 2011/0133495 | A1 * | 6/2011 | Jankowski | E05B 85/20 | 292/336.3 |
| 2012/0205959 | A1 | 8/2012 | Pacolt | | |
| 2016/0009198 | A1 | 1/2016 | Yaguchi et al. | | |
| 2017/0306661 | A1 | 10/2017 | Kim et al. | | |
| 2020/0346573 | A1 | 11/2020 | Quandt | | |
| 2025/0269782 | A1 * | 8/2025 | Downs | B60P 3/1066 | |

FOREIGN PATENT DOCUMENTS

| | | | | | |
|---|---|---|---|---|---|
| DE | 10304574 | B4 * | 2/2005 | B60N 2/01583 |
| EP | 0769599 | A1 * | 4/1997 | E05B 85/20 |
| GB | 1099649 | A * | 1/1968 | B60N 2/366 |
| GB | 1278699 | A * | 6/1972 | E05B 85/243 |
| GB | 2286626 | B * | 9/1997 | B60N 2/366 |
| JP | S62166973 | U | 10/1987 | |
| JP | 2010275798 | A | 12/2010 | |
| JP | 5359564 | B2 * | 12/2013 | |
| JP | 2017193943 | A | 10/2017 | |
| JP | 2021123252 | A * | 8/2021 | E05B 83/00 |
| KR | 20170021541 | A | 2/2017 | |
| SE | 514763 | C2 * | 4/2001 | E05B 79/20 |
| WO | WO-0114166 | A1 * | 3/2001 | B60N 2/433 |
| WO | WO-2012062377 | A1 * | 5/2012 | A01K 1/0606 |

OTHER PUBLICATIONS

International Search Report (ISR) (and English language translation thereof) and Written Opinion dated May 24, 2022, issued in International Application No. PCT/JP2022/017793.

* cited by examiner

LOCKING MECHANISM

CROSS-REFERENCE TO RELATED APPLICATIONS

This application is a Continuation Application of PCT Application No. PCT/JP2022/017793, filed Apr. 14, 2022 and based upon and claiming the benefit of priority from prior Japanese Patent Application No. 2021-069207, filed Apr. 15, 2021, the entire contents of all of which are incorporated herein by reference.

BACKGROUND OF THE INVENTION

1. Field of the Invention

The present invention relates to a locking mechanism for coupling a vessel to a trailer on which the vessel is placed.

2. Description of the Related Art

A small vessel such as a small boat and a personal watercraft is placed on a trailer for transporting vessels and carried to locations while not being used. For example, the trailer comprises a frame on which the small vessel can be placed and wheels attached to the frame. Further, the trailer comprises a locking mechanism engageable with an engaged member such as a bar provided on a hull.

US 2020/0346573 A1 discloses a locking mechanism (latch) for coupling the vessel to the trailer. The locking mechanism comprises a top plate, a bottom plate, a latching element arranged between these top plate and bottom plate, and a pawl regulating a rotation of the latching element. The top plate and the bottom plate include a notch into which the engaged member is inserted. The engaged member is engaged with the latching element by closing the notch with a hook of the latching element. In addition, in a state in which the notch is closed by the hook, the pawl engages with the latching element and suppresses the rotation of the latching element toward a direction for releasing closure of the notch caused by the hook.

In the above-described locking mechanism in US 2020/0346573 A1, when the lock of the latching element by the pawl is released, the latching element is pushed by the pawl and rotates by a certain amount. When the latching element rotates, the engaged member with which the hook is engaged also moves within the notch. At this time, a boat to which the engaged member is coupled will also move, requiring a large force to rotate the pawl. When the weight of the vessel is large, it may be difficult to release the lock by the pawl.

In addition, a conventional locking mechanism has room for various other improvements in the operability.

BRIEF SUMMARY OF THE INVENTION

According to an embodiment, a locking mechanism couples a vessel to a trailer on which the vessel is loaded. The locking mechanism comprises a base including a notch into which an engaged member can be inserted, a latching member including a hook and a first receiving surface and rotatably coupled to the base about a first rotation axis, and a locking member including a lever and a regulation portion and rotatably coupled to the base about a second rotation axis. The latching member is rotatable between an engagement position in which the notch is partially closed by the hook and the engaged member inserted into the notch is surrounded by a wall surface of the notch and the hook, and an engagement release position in which closure of the notch by the hook is released. The locking member is rotatable between a lock position in which the regulation portion abuts on the first receiving surface of the latching member in the engagement position and a rotation of the latching member toward the engagement release position is regulated, and an unlock position in which the regulation portion is spaced apart from the first receiving surface of the latching member in the engagement position. In addition, when the locking member is rotated from the lock position toward the unlock position, the latching member does not interfere with the locking member.

For example, when the latching member is in the engagement position, the first receiving surface is an arcuate curved surface having its center on the second rotation axis.

The locking mechanism may further comprise a first elastic body urging the latching member toward the engagement release position and a second elastic body urging the locking member toward the lock position.

The latching member may further include an actuation arm opposed to the hook. In this case, when the latching member is in the engagement release position, the actuation arm may partially close the notch, and when the engaged member is inserted into the notch, the actuation arm may be pressed by the engaged member to rotate the latching member toward the engagement position against an urging force of the first elastic body.

The latching member may further include a second receiving surface to which the regulation portion is pressed by the urging force of the second elastic body when the latching member is in the engagement release position and the locking member is in the unlock position. In this case, when the latching member rotates from the engagement release position toward the engagement position, the regulation portion may slide the second receiving surface, and when the regulation portion finishes sliding the second receiving surface, the locking member may be rotated to the lock position by the urging force of the second elastic body.

The locking mechanism may further comprise a plunger attached to the base. In this case, the locking member may include an engagement portion which is engaged with the plunger when the locking member is in the unlock position, and an engagement between the plunger and the engagement portion may regulate the rotation of the locking member toward the lock position by the urging force of the second elastic body.

The locking member may further include a release arm provided to be spaced apart from the regulation portion in a rotational direction of the locking member. The latching member may further include a protrusion located between the regulation portion and the release arm in the rotational direction of the latching member when the latching member is in the engagement position. In this case, when the latching member rotates from the engagement position toward the engagement release position, the protrusion may press the release arm to rotate the latching member and release the engagement between the plunger and the engagement portion.

According to the embodiments, a locking mechanism excellent in the operability can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the accompanying drawings.

First Embodiment

Figure 1:
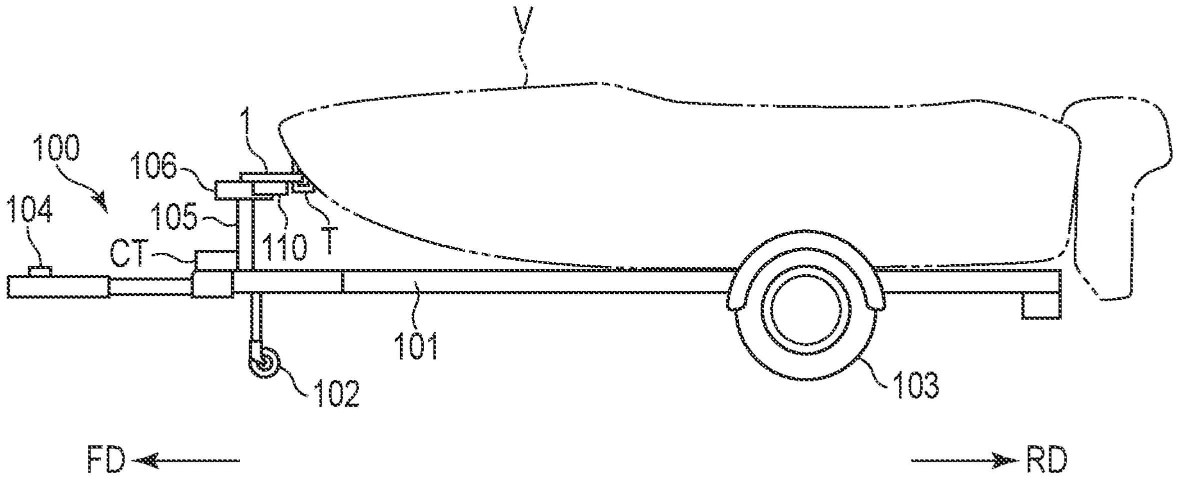
FIG. 1 is a schematic side view showing a vessel and a trailer according to a first embodiment.

FIG. 1 is a schematic side view showing a vessel V and a trailer 100 according to a first embodiment. The vessel V is, for example, a small vessel such as a small boat and a personal watercraft. A forward direction FD and a backward direction RD of the trailer 100 are defined as indicated by arrows in FIG. 1. The forward direction FD and the backward direction RD are directions opposite to each other.

The trailer 100 comprises a frame 101 on which the vessel V is placed. The frame 101 is provided with a front wheel 102 and rear wheels 103. An end portion of the frame 101 in the forward direction FD is provided with a coupling member 104 for coupling the trailer 100 to a vehicle.

A pillar 105 extends from the frame 101 in the vicinity of the front wheel 102 in an upward direction. A supporting member 106 is provided on a tip of the pillar 105. A locking mechanism 1 is attached to the supporting member 106 via a holding mechanism 110.

An engaged member T is provided in the vicinity of a bow of the vessel V. The engaged member T is a bar bent in, for example, a U-letter shape or a J-letter shape, but not limited to this example. The locking mechanism 1 is engageable with the engaged member T.

When the vessel V is transported, the vessel V is arranged in the backward direction RD of the frame 101 and moved in the forward direction FD to be loaded on the frame 101. Further, the engaged member T is engaged with the locking mechanism 1. When the vessel V is unloaded, an engagement between the engaged member T and the locking mechanism 1 is released, and the vessel V is moved in the backward direction RD.

A control unit CT is arranged on the frame 101. In the example shown in FIG. 1, the control unit CT is arranged in the vicinity of a root of the pillar 105, but the control unit CT may be arranged at other positions. For example, the control unit CT comprises a waterproof box and electronic components contained in the box such as a control board and a power supply unit. The control unit CT may comprise a wireless communication unit and a lamp.

Figure 2:
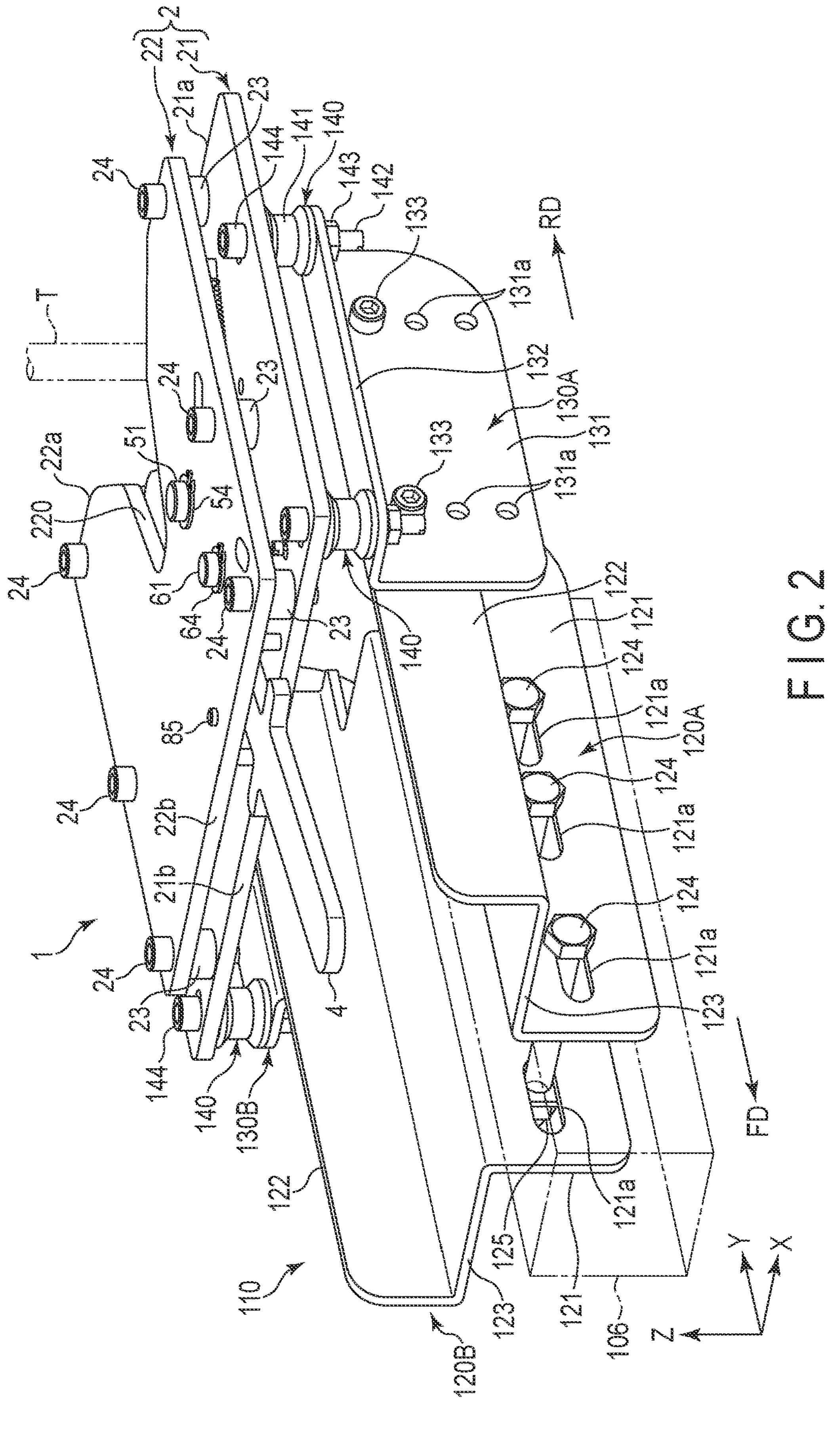
FIG. 2 is a schematic perspective view showing a locking mechanism and a holding mechanism according to the first embodiment.
Figure 3:
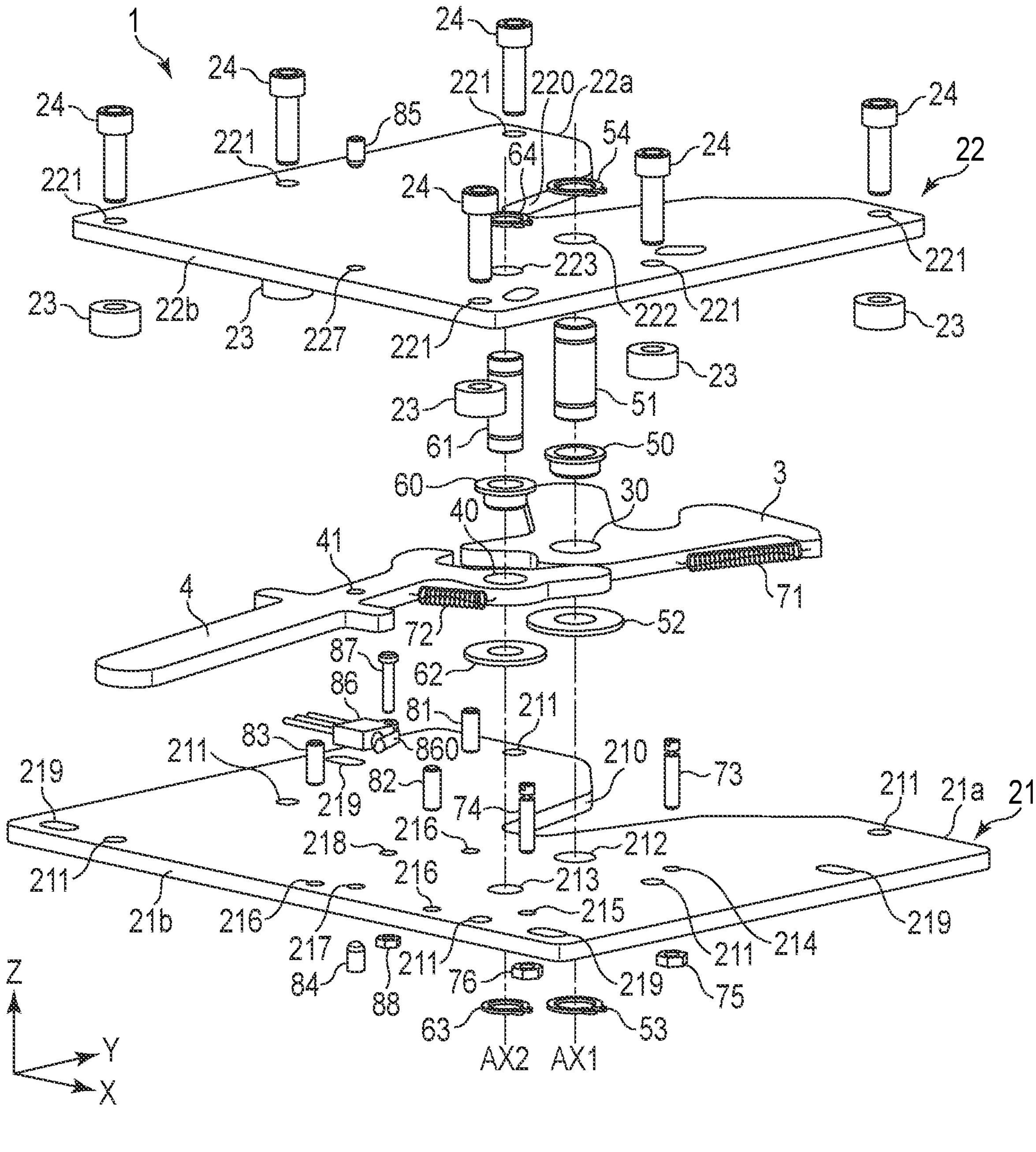
FIG. 3 is a schematic exploded perspective view showing the locking mechanism shown in FIG. 2.

FIG. 2 is a schematic perspective view showing the locking mechanism 1 and the holding mechanism 110 according to the present embodiment. FIG. 3 is a schematic exploded perspective view showing the locking mechanism 1 shown in FIG. 2. In the following descriptions, a first direction X, a second direction Y and a third direction Z, which are orthogonal to each other, are defined as shown in the figure. In addition, viewing the locking mechanism 1, the holding mechanism 110, and the like parallel to the third direction Z is referred to as a plan view. For example, the first direction X corresponds to a width direction of the trailer 100, the second direction Y corresponds to a length direction of the trailer 100, and the third direction Z corresponds to a height direction of the trailer 100.

As shown in FIG. 2, the locking mechanism 1 comprises a base 2. The base 2 is composed of a first baseplate 21 and a second baseplate 22 arranged to be spaced apart from and parallel to each other in the third direction Z.

As shown in FIG. 3, the first baseplate 21 includes a notch 210, and the second baseplate 22 includes a notch 220. The notch 210 is recessed in a V-letter shape from a side 21*a* (side of a backward direction RD side) of the first baseplate 21 in the second direction Y. The notch 220 is recessed in the V-letter shape from a side 22*a* (side of the backward direction RD side) of the second baseplate 22 in the second direction Y. For example, the notches 210 and 220 have the same shape in the plan view. The engaged member T can be inserted into the notches 210 and 220.

The first baseplate 21 includes a plurality of female threads 211 respectively formed in the vicinity of both sides in the first direction X. The second base plate 22 includes a plurality of through holes 221 provided at positions corresponding to each female thread 211. Further, cylindrical spacers 23 are arranged at positions corresponding to the female threads 211 and the through holes 221 between the first baseplate 21 and the second baseplate 22. A bolt 24 is put through each of the through holes 221 and the spacers 23, and a tip of the bolt 24 is screwed into the female thread 211. In other words, the first baseplate 21 and the second baseplate 22 are fixed to each other by the bolts 24 with a gap corresponding to the height of the spacer 23.

The locking mechanism 1 further comprises a latching member 3 and a locking member 4. The latching member 3 and the locking member 4 are arranged between the first baseplate 21 and the second baseplate 22.

The latching member 3 is rotatably coupled to the first baseplate 21 and the second baseplate 22 about a first rotation axis AX1. The locking member 4 is rotatably coupled to the first baseplate 21 and the second baseplate 22 about a second rotation axis AX2.

The latching member 3 includes a through hole overlapping with the first rotation axis AX1. The first base plate 21 includes a through hole 212 overlapping with the first rotation axis AX1. The second base plate 22 includes a through hole 222 overlapping with the first rotation axis AX1. A bearing 50 including a flange interposed between the latching member 3 and the second baseplate 22 is inserted into the through hole 30. A shaft 51 is inserted into the bearing 50. The shaft 51 is also inserted into a washer 52 arranged between the latching member 3 and the first baseplate 21.

One end portion of the shaft 51 protrudes from the first baseplate 21 in a downward direction in FIG. 3, and a retaining ring 53 is fitted into an annular groove provided in the vicinity of the end portion. The other end portion of the shaft 51 protrudes from the second base plate 22 in the upward direction in FIG. 3, and a retaining ring 54 is fitted into the annular groove provided in the vicinity of the protruding end portion (refer to FIG. 2).

The locking member 4 includes a through hole 40 overlapping with the second rotation axis AX2. The first baseplate 21 includes a through hole 213 overlapping with the second rotation axis AX2. The second baseplate 22 includes a through hole 223 overlapping with the second rotation axis AX2. A bearing 60 including the flange interposed between the locking member 4 and the second baseplate 22 is inserted into the through hole 40. A shaft 61 is inserted into the bearing 60. The shaft 61 is also inserted into a washer 62 arranged between the locking member 4 and the first baseplate 21.

One end portion of the shaft 61 protrudes from the first base plate 21 in the downward direction in FIG. 3, and a retaining ring 63 is fitted into the annular groove provided in the vicinity of the end portion. The other end portion of the shaft 61 protrudes from the second base plate 22 in the upward direction in FIG. 3, and a retaining ring 64 is fitted into the annular groove provided in the vicinity of the protruding end portion (see FIG. 2).

The locking mechanism 1 further comprises a first elastic body 71 urging the latching member 3 and a second elastic body 72 urging the locking member 4. The first elastic body 71 and the second elastic body 72 are arranged between the first baseplate 21 and the second baseplate 22. In the present embodiment, the first elastic body 71 and the second elastic body 72 are coil springs. As the first elastic body 71 and the second elastic body 72, which are not limited to this example, other elastic bodies such as torsion springs and the like can also be employed.

The first baseplate 21 includes female threads 214 and 215. A post 73 on which a male thread is formed is screwed into the female thread 214. A tip of the post 73 protrudes from the first baseplate 21 in the downward direction in FIG. 3 and is screwed into a nut 75. A post 74 on which the male thread is formed is screwed into the female thread 215. A tip of the post 74 protrudes from the first baseplate 21 in the downward direction in FIG. 3 and is screwed into a nut 76. One end of the first elastic body 71 is connected to the latching member 3, and the other end is connected to the post 73. One end of the second elastic body 72 is connected to the locking member 4, and the other end is connected to the post 74.

The locking mechanism 1 further comprises stoppers 81, 82, and 83, plungers 84 and 85, and a sensor 86. The first baseplate 21 includes through holes 216 at positions respectively corresponding to the stoppers 81, 82, and 83. The stoppers 81, 82, and 83 are, for example, pins fitted into these through holes 216 and protrude between the first baseplate 21 and the second baseplate 22.

The first baseplate 21 includes a female thread 217 at a position corresponding to the plunger 84. The second baseplate 22 includes a female thread 227 at a position corresponding to the plunger 85. The male thread is formed on the plunger 84 and screwed into the female thread 217. Similarly, the male thread is formed on the plunger 85 and fitted into the female thread 227.

The plungers 84 and 85 are ball plungers including a ball-shaped movable piece urged by, for example, the coil spring. The movable pieces of the plungers 84 and 85 protrude between the first baseplate 21 and the second baseplate 22 and are opposed to each other in the third direction Z.

The locking member 4 includes an engagement portion 41 engageable with the plungers 84 and 85. For example, the engagement portion 41 is a through hole penetrating the locking member 4. The engagement portion 41 may be a recess or a groove formed in both surfaces in the third direction Z of the locking member 4.

The first baseplate 21 includes a through hole 218 at a position corresponding to a sensor 86. A bolt 87 is inserted into the through hole 218 and an aperture provided in the sensor 86. A tip of the bolt 87 protrudes from the first baseplate 21 in the downward direction in FIG. 3 and is screwed into a nut 88. The sensor 86 is a limit switch including, for example, a contact maker 860.

As shown in FIG. 3, the first baseplate 21 includes a plurality of through holes 219 formed in the vicinity of both sides in the first direction X. These through holes 219 are used for coupling the locking mechanism 1 to the holding mechanism 110.

As shown in FIG. 2, the holding mechanism 110 comprises a pair of first brackets 120A and 120B and a pair of second brackets 130A and 130B. The first brackets 120A and 120B each include plate-like attachment portions 121 and 122 parallel to the second direction Y and the third direction Z and an intermediate portion 123 connecting the attachment portions 121 to 122. The attachment portion 121 includes a plurality of through holes 121*a*. In the example of FIG. 2, the above-described supporting member 106 is arranged between the attachment portions 121 of the first brackets 120A and 120B. Further, a bolt 124 is inserted into each through hole 121*a* and a tip of the bolt is screwed into a nut 125. As a result, the supporting member 106 is sandwiched between the attachment portions 121 of the first brackets 120A and 120B.

The second brackets 130A and 130B include plate-like attachment portions 131 parallel to the second direction Y and the third direction Z, and plate-like attachment portions 132 parallel to the first direction X and the second direction Y. The attachment portion 131 of the second bracket 130A includes a plurality of through holes 131*a*. A bolt 133 is inserted into several through holes 131*a*. The bolt 133 is also inserted into a through hole provided in the attachment portion 122 of the first bracket 120A and a tip of the bolt is screwed into a nut which is not shown. As a result, the first bracket 120A and the second bracket 130A are coupled to each other. The first bracket 120B and the second bracket 130B are coupled to each other by the same configuration.

The attachment portions 132 of the second brackets 130A and 130B are coupled to the first baseplate 21 by a plurality of coupling members 140. The coupling member 140 includes an elastic body 141 for preventing vibration which is located between the attachment portion 132 and the first baseplate 21, and a male thread 142 extending from the elastic body 141 in the downward direction in the figure. The elastic body 141 is formed of, for example, a rubber. The male thread 142 is inserted into the through hole provided in the attachment portion 132 and a tip of the thread is screwed into the nut 143. Further, the coupling member 140 includes a female thread opening toward the end portion in the upward direction in the figure. A bolt 144 inserted into the through hole 219 (refer to FIG. 2) of the first baseplate 21 is screwed into the female thread.

FIGS. 4 to 8 are schematic plan views showing the locking mechanism 1. In the figures, the second baseplate 22, the bolt 24, and the like are not illustrated. The notch 210 has a shape in which the width in the first direction X gradually decreases from the side 21*a* of the first baseplate 21 to a bottom portion 210*a*. The notch 220 includes the same shape as the notch 210.

The latching member 3 is rotatable about the first rotation axis AX1 in a first rotational direction R1*a* and a second rotational direction R2*a*. The locking member 4 is rotatable about the second rotation axis AX2 in a first rotational direction Rib and a second rotational direction R2*b*. The first rotational directions R1*a* and Rib are clockwise directions in FIGS. 4 to 8. The second rotational directions R2*a* and R2*b* are counterclockwise directions in FIGS. 4 to 8.

The latching member 3 includes a connection hole 31 to which one end of the first elastic body 71 is hooked. The locking member 4 includes a connection hole 42 to which one end of the second elastic body 72 is hooked. The latching member 3 is urged by the first elastic body 71 in the first rotational direction R1*a*. The locking member 4 is urged by the second elastic body 72 in the second rotational direction R2*b*.

The latching member 3 includes a hook 32, an actuation arm 33, and a protrusion 34. The hook 32 extends in a radial direction about the first rotation axis AX1 and includes a shape in which a tip of the hook protrudes in the second rotational direction R2*a*. The actuation arm 33 extends in the radial direction about the first rotation axis AX1. The actuation arm 33 is opposed to the hook 32 in the rotational directions R1*a* and R2*a*. A gap G that can accommodate the engaged member T is formed between the hook 32 and the actuation arm 33. In the present embodiment, a center line C of the gap G does not overlap with the first rotation axis AX1. The center line C passes through between the first rotation axis AX1 and the connection hole 31.

The protrusion 34 extends in the radial direction about the first rotation axis AX1. In the examples of FIGS. 4 to 8, a distance between a tip of the protrusion 34 and the first rotation axis AX1 is shorter than a distance between a tip of the actuation arm 33 and the first rotation axis AX1. The connection hole 31 to which the first elastic body 71 is connected is provided in an end portion of the hook 32 in the first rotational direction R1*a*.

The latching member 3 further includes a first receiving surface 35 and a second receiving surface 36 adjacent to the first receiving surface 35. The first receiving surface 35 is located between the hook 32 and the protrusion 34 in the first rotational direction R1*a*. The first receiving surface 35 is a curved surface crossing the rotational directions R1*a* and R2*a*. The second receiving surface 36 is located between the hook 32 and the first receiving surface 35 in the first rotational direction R1*a*. The second receiving surface 36 is, for example, an arcuate curved surface with the first rotation axis AX1 being a center of curvature.

The locking member 4 includes a lever 43, a regulation portion 44, and a release arm 45. The lever 43 has a long shape extending linearly and protrudes from a side 21*b* (side of a forward direction FD side) of the first baseplate 21 in the second direction Y. In addition, the lever 43 protrudes from a side 22*b* of the second baseplate 22 overlapping with the side 21*b* (refer to FIG. 2).

The regulation portion 44 extends in a radial direction about the second rotation axis AX2. In the examples of FIGS. 4 to 8, a tip portion 44*a* of the regulation portion 44 is rounded in a semicircular shape. The release arm 45 is provided to be spaced apart from the regulation portion 44 in the rotational directions Rib and R2*b*. The connection hole 42 to which the second elastic body 72 is connected is provided in the lever 43.

The stopper 81 is located between the actuation arm 33 and the protrusion 34 in the rotational directions Ria and R2*a*. The stopper 82 is located on a second rotational direction R2*b* side of the lever 43, and the stopper 83 is located on a first rotational direction Rib side of the lever 43. In other words, the lever 43 is located between the stoppers 82 and 83 in the rotational directions Rib and R2*b*.

Then, a series of operations of the locking mechanism 1 will now be described.

Figure 4:
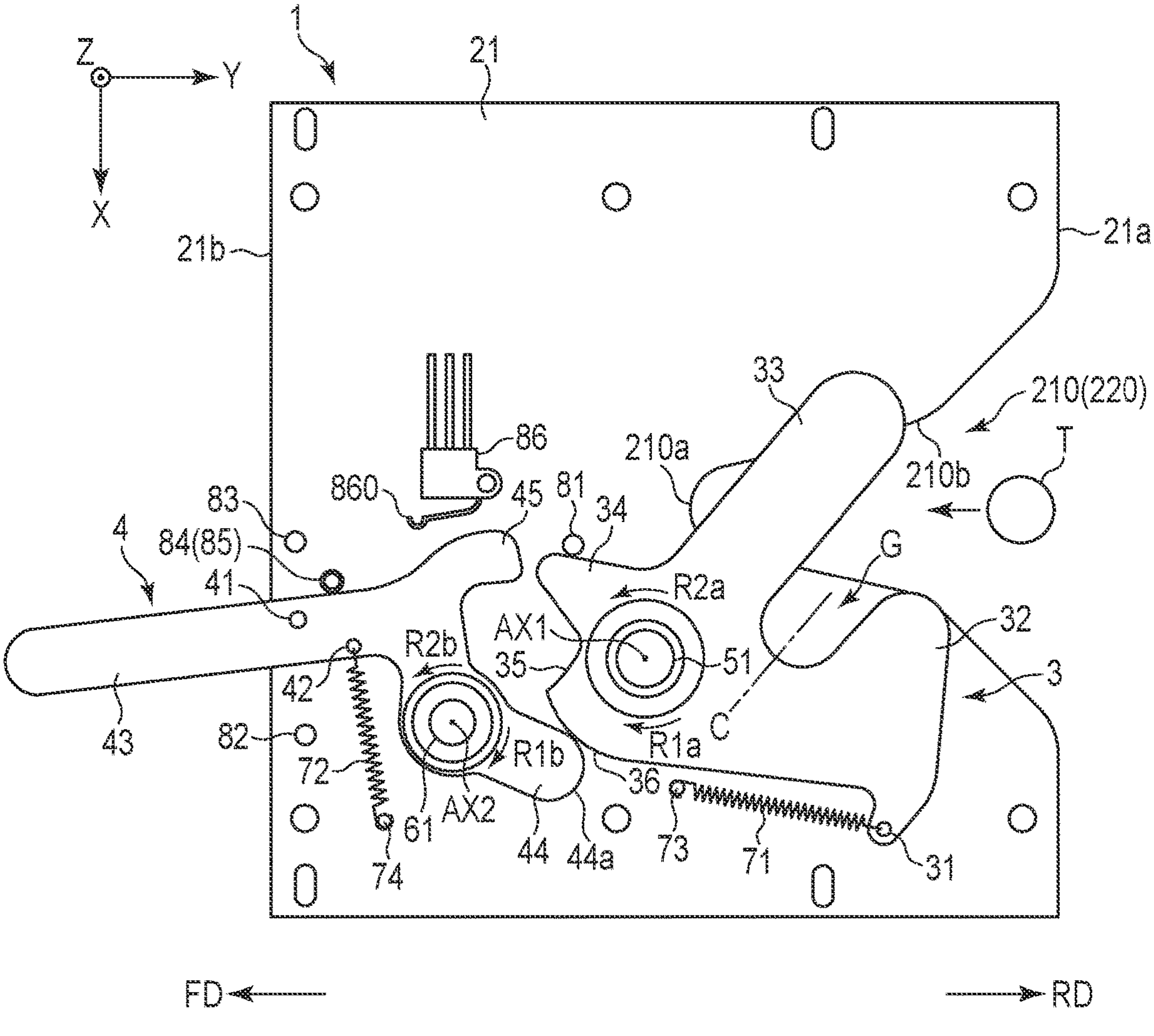
FIG. 4 is a schematic plan view showing the locking mechanism in which a latching member is in an engagement release position and a locking member is in a standby position.

In FIG. 4, the protrusion 34 is pressed against the stopper 81 by an urging force of the first elastic body 71. In this state, the latching member 3 cannot be rotated in the first rotational direction R1*a*. Such a position (posture) of the latching member 3 is hereinafter referred to as an engagement release position.

In the engagement release position, the hook 32 does not overlap with the notches 210 and 220 in the third direction Z. In other words, the hook 32 does not close the notches 210 and 220. On the other hand, the actuation arm 33 overlaps with the notches 210 and 220 and partially closes the notches 210 and 220 (intermediate portion in the second direction Y).

When the latching member 3 is in the engagement release position, the tip portion 44*a* of the regulation portion 44 is pressed against the second receiving surface 36 by the urging force of the second elastic body 72. As a result, the rotation of the locking member 4 in the second rotational direction R2*b* is restricted. Such a position (posture) of the locking member 4 is hereinafter referred to as a standby position. When the locking member 4 is in the standby position, the contact maker 860 of the sensor 86 is not in contact with the locking member 4. In addition, the plungers 84 and 85 are not engaged with the engagement portion 41.

When the engaged member T is moved toward the bottom portion 210*a* of the notch 210 in the state shown in FIG. 4, the engaged member T is brought into contact with the actuation arm 33. When the engaged member T is further moved, the actuation arm 33 is pressed by the engaged member T, and the latching member 3 rotates in the second rotational direction R2*a* against the urging force of the first elastic body 71. During the rotation, the second receiving surface 36 slides on the tip portion 44*a* of the regulation portion 44. Since the second receiving surface 36 is the curved surface with the first rotation axis AX1 being the center of curvature, the rotation of the latching member 3 is not inhibited by the regulation portion 44.

Figure 5:
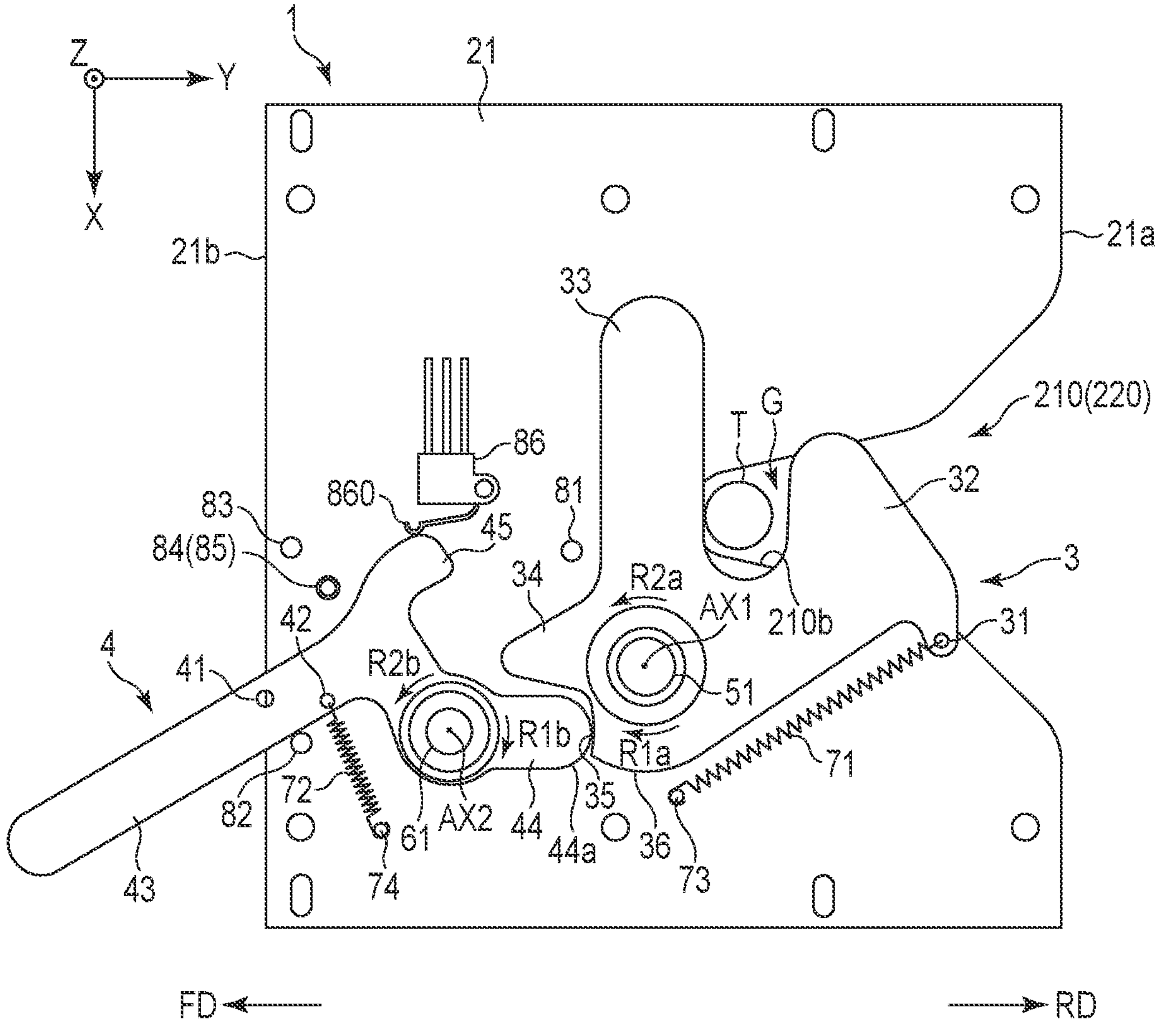
FIG. 5 is a schematic plan view showing the locking mechanism in which the latching member is in an engagement position and a locking member is in a lock position.

In FIG. 5, the engaged member T is pressed to the vicinity of the bottom portion 210*a*. The engaged member T is located in the gap G. Further, a part of the notches 210 and 220 (intermediate portion in the second direction Y) is closed by the hook 32. The engaged member T is surrounded by the hook 32, the actuation arm 33 and a wall surface 210*b* of the notch 210. Such a position (posture) of the latching member 3 is hereinafter referred to as an engagement position.

When the latching member 3 rotates from the engagement release position to the engagement position, the regulation portion 44 finishes sliding on the second receiving surface 36. At this time, the locking member 4 rotates in the second rotational direction R2*b* by the urging force of the second elastic body 72 until the lever 43 is brought into contact with the stopper 82. In a state where the lever 43 and the stopper 82 are in contact, the tip portion 44*a* of the regulation portion 44 abuts on the first receiving surface 35. Such a position (posture) of the locking member 4 is hereinafter referred to as a lock position.

When the locking member 4 is in the lock position, the rotation of the latching member 3 toward the engagement release position is suppressed since the first receiving surface 35 is in contact with the regulation portion 44. Therefore, the latching member 3 is maintained in the engagement position, and the engaged member T cannot be pulled out from the notches 210 and 220.

A force acting on the locking member 4 from the latching member 3 at a contact point between the first receiving surface 35 and the regulation portion 44 is approximately parallel to the radial direction about the second rotation axis AX2. Therefore, even if a strong force for rotating the locking member 4 in the first rotational direction R1*a* is applied, a moment to rotate the locking member 4 in the first rotational direction Rib is not generated. The force acting on the locking member 4 from the latching member 3 at the contact point may generate a moment to rotate the locking member 4 in the second rotational direction R2*b*. Even in this case, the locking member 4 does not rotate in the first rotational direction Rib, or in the second rotational direction R2*b* since the lever 43 is in contact with the stopper 82, either.

When the locking member 4 is in the lock position, the release arm 45 is brought into contact with the contact maker 860 of the sensor 86. At this time, the sensor 86 outputs a detection signal to the control unit CT (refer to FIG. 1). In accordance with receipt of the detection signal, the control unit CT reports that the locking member 4 is in the lock position. For example, the control unit CT turns on a specific lamp. As another example, the control unit CT may transmit a signal indicating that the locking member 4 is in the lock position to an electronic device such as a smartphone by a wireless communication unit.

Figure 6:
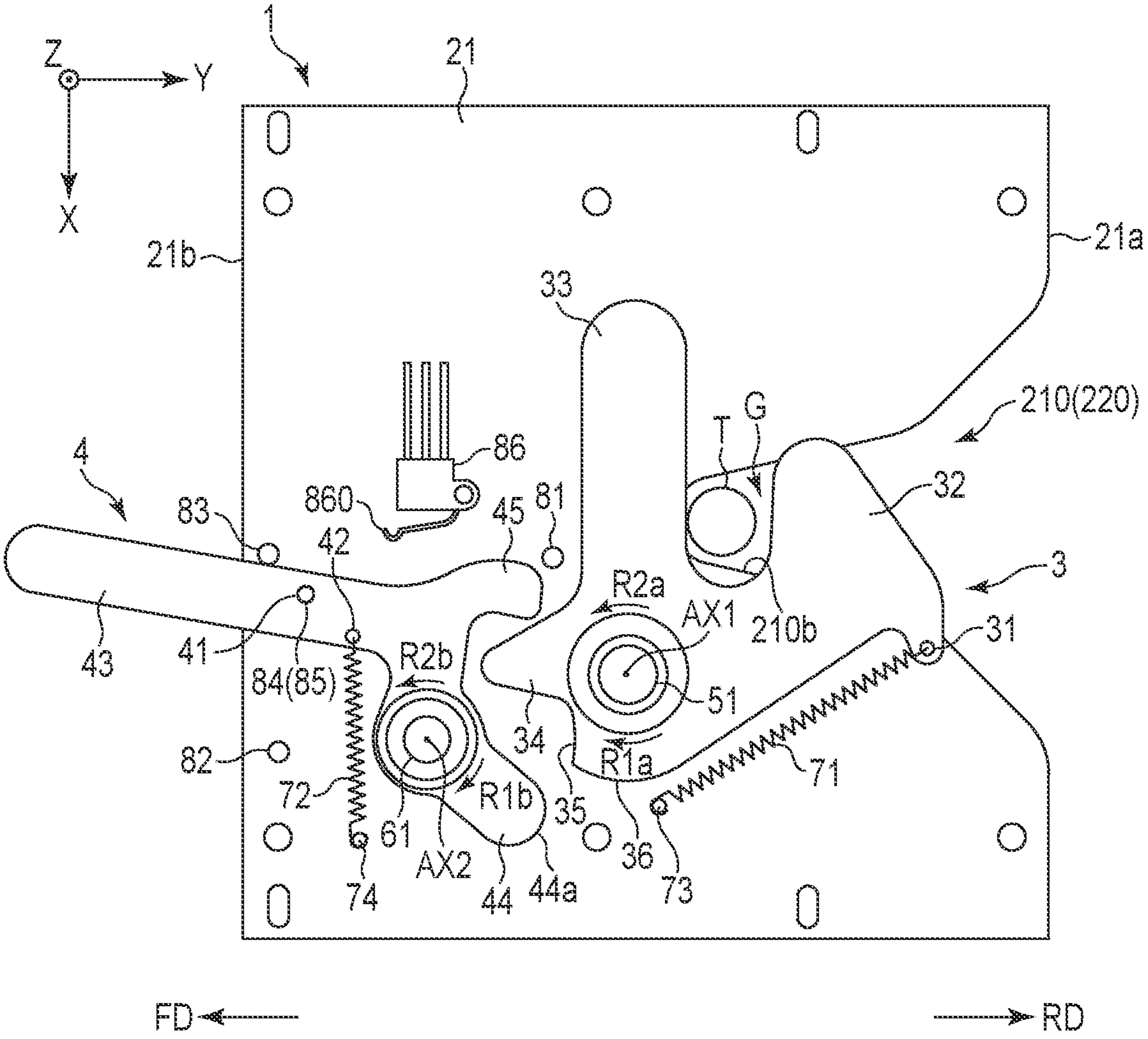
FIG. 6 is a schematic plan view showing the locking mechanism in which the latching member is in the engagement position and the locking member is in an unlock position.

The locking member 4 in the lock position can be rotated in the first rotational direction Rib by operating the lever 43. In FIG. 6, the locking member 4 rotates to the position where the lever 43 is in contact with the stopper 83. Such a position (posture) of the locking member 4 is hereinafter referred to as an unlock position.

In the unlock position, the plungers 84 and 85 are engaged with the engagement portion 41. As a result, the rotation of the locking member 4 toward the lock position by the urging force of the second elastic body 72 is regulated. Further, in the unlock position, the regulation portion 44 and the first receiving surface 35 are spaced apart from each other. The protrusion 34 is located between the regulation portion 44 and the release arm 45 in the rotational directions R1*a* and R2*a*.

In the unlock position, the contact maker 860 and the release arm 45 are spaced apart from each other. At this time, the sensor 86 stops outputting the detection signal to the control unit CT. The control unit CT reports, for example, that the locking member 4 is in the unlock position. For example, the control unit CT turns off the lamp that is turned on when the locking member 4 is in the lock position. As another example, the control unit CT may transmit a signal indicating that the locking member 4 is in the unlock position to an electronic device such as a smartphone by a wireless communication unit.

In the example in FIG. 6, the engaged member T is in contact with the actuation arm 33. As a result, the latching member 3 is stationary. If the engaged member T is not in contact with the actuation arm 33, the latching member 3 rotates in the first rotational direction R1*a* until the protrusion 34 is brought into contact with the release arm 45. For example, the latching member 3 is stationary in a state where the protrusion 34 is in contact with the release arm 45.

In the present embodiment, the regulation portion 44 does not interfere with the latching member 3 when the locking member 4 is rotated from the lock position toward the unlock position. Other parts of the locking member 4 also do not interfere with the latching member 3. As a result, the locking member 4 can be rotated from the lock position to the unlock position without substantially rotating the latching member 3. Here, "without substantially rotating the latching member 3" implies not only a case where the latching member 3 does not rotate at all, but also a case where the latching member 3 rotates slightly by a few degrees due to sliding between the first receiving surface 35 and the tip portion 44*a*. As an example, the latching member 3 may rotate by a slight angle corresponding to the differences between the width of the engaged member T and that of the gap G.

When the latching member 3 is in the engagement position as shown in FIG. 5, it is desirable for the first receiving surface 35 to be the arcuate curved surface with the second rotation axis AX2 being the center of curvature. As a result, the locking member 4 can be rotated smoothly toward the unlock position. However, the first receiving surface 35 may be in various other shapes as long as the surface is in contact with the tip portion 44*a* of the regulation portion 44 when the locking member 4 is in the lock position and the shape does not inhibit the rotation of the locking member 4 toward the unlock position.

Figure 7:
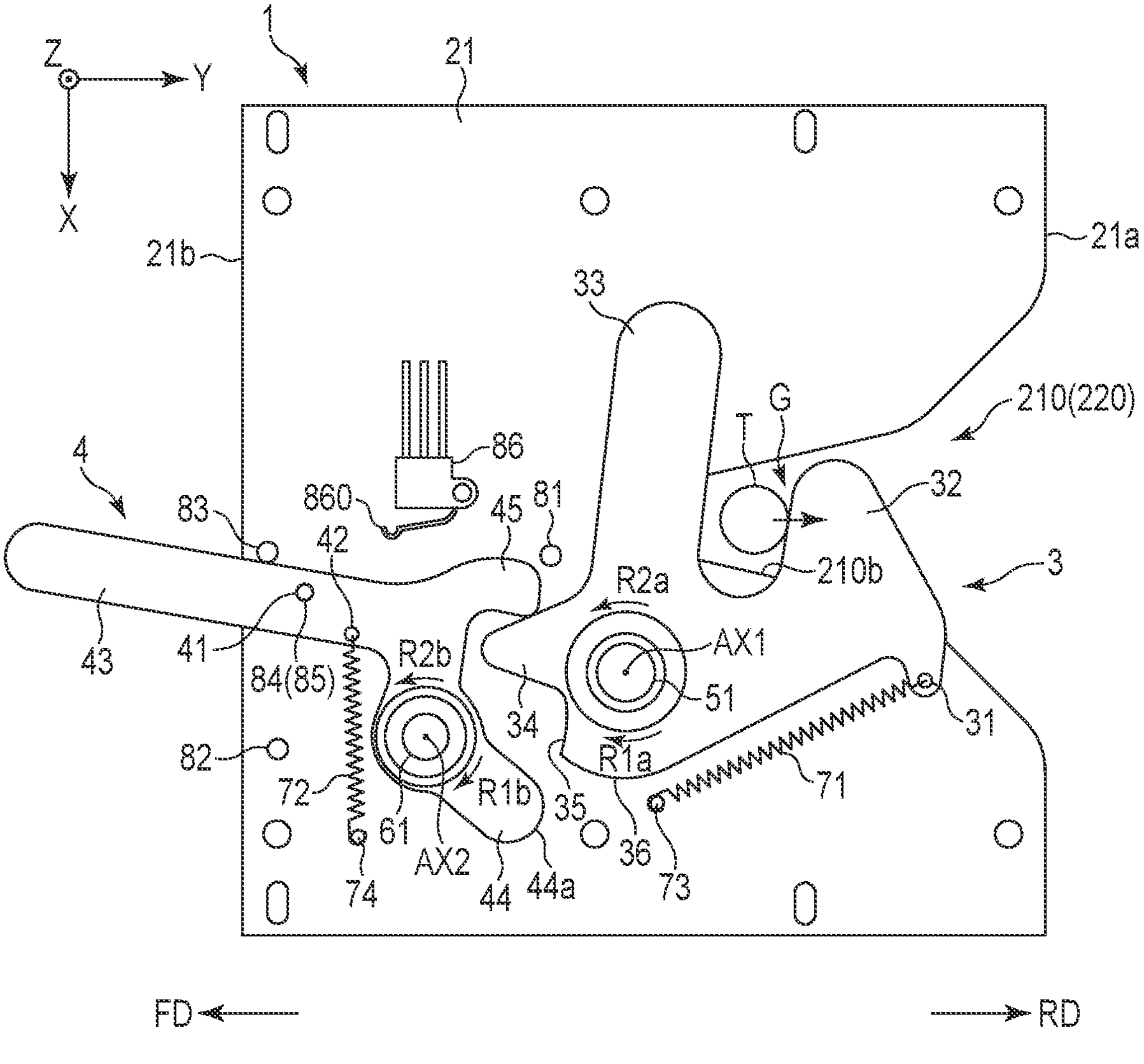
FIG. 7 is a schematic plan view showing the locking mechanism in which the latching member is rotating from the engagement position toward the engagement release position and the locking member is in the unlock position.

When the engaged member T is moved from a state shown in FIG. 6 to the backward direction RD as shown in FIG. 7, the hook 32 is pressed by the engaged member T. As a result, the latching member 3 rotates in the first rotational direction R1*a*. At this time, the protrusion 34 presses the release arm 45 to release the engagements between the plungers 84 and 85 and the engagement portion 41. The locking member 4 rotates in the second rotational direction R2*b* by the urging force of the second elastic body 72. When the tip portion 44*a* of the regulation portion 44 is brought into contact with the second receiving surface 36 as shown in FIG. 8, the rotation of the locking member 4 stops.

Figure 8:
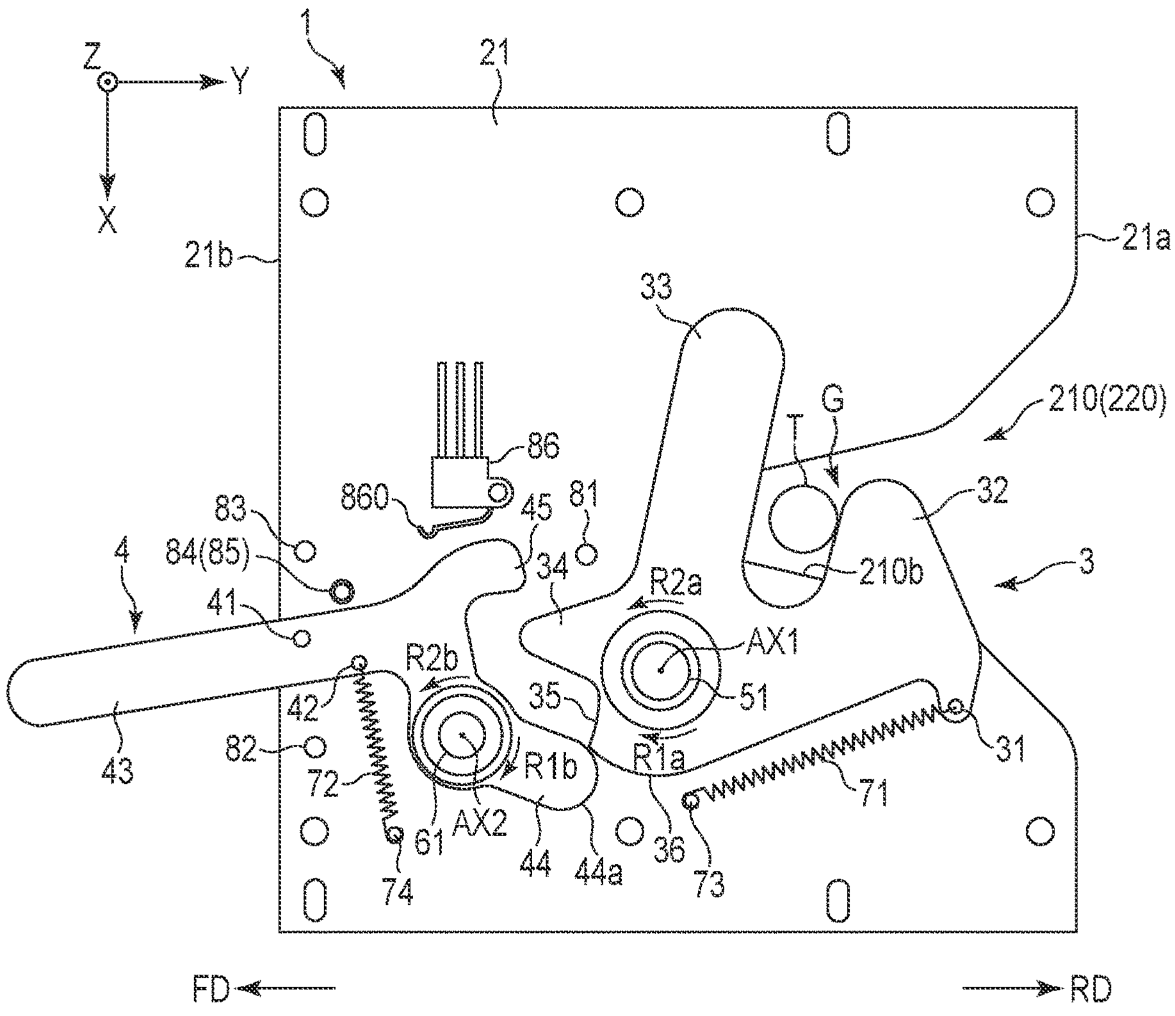
FIG. 8 is a schematic plan view showing the locking mechanism in which the latching member is rotating from the engagement position toward the engagement release position and the locking member is rotating from the unlock position toward the standby position.

When the engaged member T is further moved to the backward direction RD from the state shown in FIG. 8, the latching member 3 and the locking member 4 return to the state shown in FIG. 4. In other words, the latching member 3 rotates to the engagement release position to release the closes of the notches 210 and 220 by the hook 32. At this time, the engaged member T can be pulled out from the notches 210 and 220. The locking member 4 returns to the standby position where the regulation portion 44 is in contact with the second receiving surface 36.

As described above, in the locking mechanism 1 of the present embodiment, the locking member 4 does not interfere with the latching member 3 when the locking member 4 is rotated from the lock position to the unlock position. As a result, a lock which is caused by the locking member 4 can easily be released regardless of a load applied to the latching member 3.

If the locking member 4 interferes with the latching member 3 when the locking member 4 rotates from the lock position to the unlock position, the latching member 3 also rotates in the first rotational direction R1*a* or the second rotational direction R2*a* in association with the rotation of the locking member 4. At this time, since the vessel V to which the engaged member T is coupled also moves, it is necessary to operate the lever 43 with a large force. When the weight of the vessel V is large, it may be difficult to operate the lever 43.

On the other hand, with the configuration of the present embodiment, the lever 43 can easily be operated even when the weight of the vessel V is large. In addition, since the engaged member T does not move when the locking member 4 is rotated from the lock position to the unlock position, the vessel V can be moved at any timing after the lock is released.

In the present embodiment, the first elastic body 71 always urges the latching member 3 toward the engagement release position. Therefore, when the lock which is caused by the locking member 4 is released and the engaged member T is pulled out from the notches 210 and 220, the latching member 3 stands by in the engagement release position. As a result, no special preparation such as rotating the latching member 3 to the unlock position is required for coupling the engaged member T to the locking mechanism 1 next time.

In the present embodiment, the second elastic body 72 always urges the locking member 4 toward the lock position. Therefore, when the engaged member T is pressed to the notches 210 and 220, the locking member 4 automatically rotates to the lock position. As a result, it is unnecessary to operate the lever 43 for rotating the locking member 4 from the unlock position to the lock position.

In the present embodiment, when the latching member 3 rotates from the engagement position toward the engagement release position, the protrusion 34 presses the release arm 45 to release the engagements between the plungers 84 and 85 and the engagement portion 41. As a result, the locking member 4 can be rotated automatically to the standby position.

As described above, according to the present embodiment, the locking mechanism 1 with significantly improved operability can be provided. Besides this, various other favorable effects can be obtained from the present embodiment.

Second Embodiment

Figure 9:
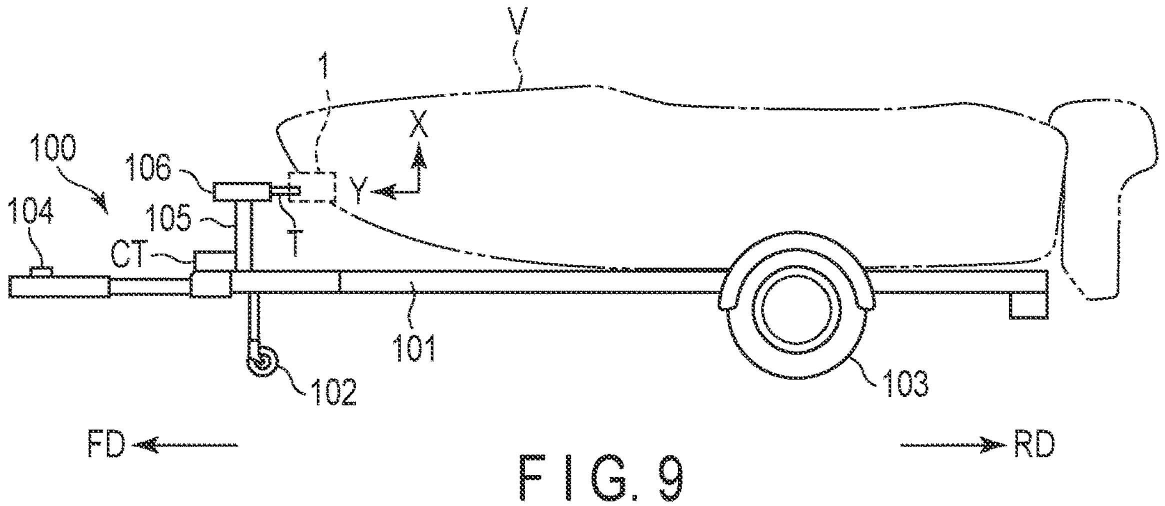
FIG. 9 is a schematic side view showing a vessel and a trailer according to a second embodiment.

FIG. 9 is a schematic side view showing a vessel V and a trailer 100 according to a second embodiment. In the present embodiment, a locking mechanism 1 is provided on the vessel V, and an engaged member T is arranged on the trailer 100. The engaged member T is coupled to, for example, a supporting member 106. It is desirable for the locking mechanism 1 to be provided on the vessel V such that the second direction Y shown in FIGS. 2 to 8 conforms to, for example, the forward direction FD.

The locking mechanism 1 is arranged in the vicinity of a bow of the vessel V. In this case, a lever 43 may be operable from inside the vessel V. In addition, the lever 43 may be connected to a push-pull cable and operable via the push-pull cable.

The same advantages as those of the first embodiment can also be obtained from the configuration of the present embodiment.

Third Embodiment

Figure 10:
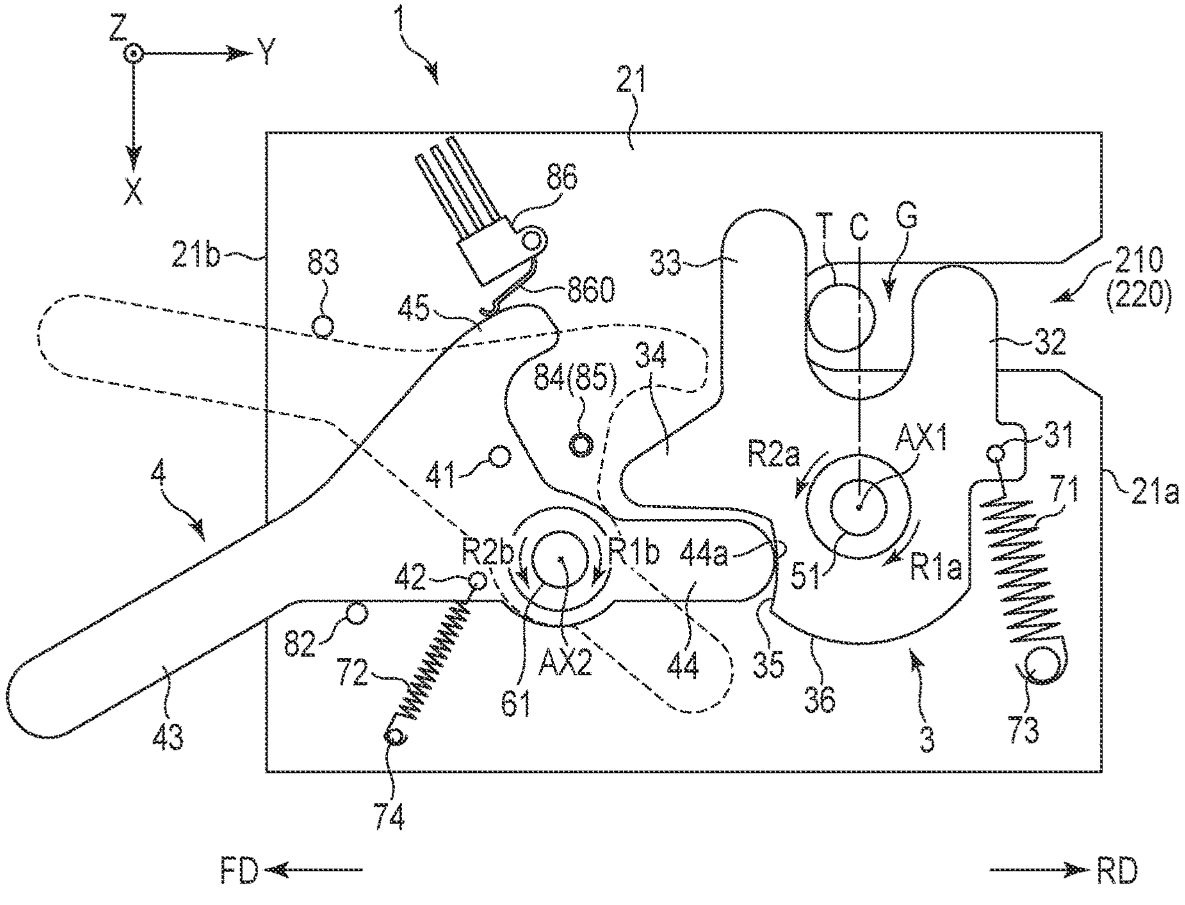
FIG. 10 is a schematic plan view showing a locking mechanism according to a third embodiment.

FIG. 10 is a schematic plan view showing a locking mechanism 1 of a third embodiment. In the locking mechanism 1 shown in this figure, a latching member 3 includes a connection hole 31, a hook 32, an actuation arm 33, a protrusion 34, a first receiving surface 35, and a second receiving surface 36 in the same manner as the first embodiment. In addition, a locking member 4 includes an engagement portion 41, a connection hole 42, a lever 43, a regulation portion 44, and a release arm 45 in in the same manner as the first embodiment. A role of each portion of the latching member 3 and the locking member 4 is the same as that in the first embodiment. In the example of FIG. 10, a center line C of a gap G overlaps with a first rotation axis AX1. In addition, a first elastic body 71 is a coil spring having a diameter larger than a second elastic body 72.

In FIG. 10, the latching member 3 is in an engagement position and engaged with an engaged member T. In addition, the locking member 4 is in a lock position, and a tip portion 44*a* of the regulation portion 44 is in contact with the first receiving surface 35. The locking member 4 can be rotated to an unlock position indicated by a broken line. In the same manner as the first embodiment, the latching member 3 does not interfere with the locking member 4 when the locking member 4 is rotated from the lock position to the unlock position. When the locking member 4 is in the unlock position, the latching member 3 can be rotated to an engagement release position.

The same advantages as those of the first embodiment can also be obtained from the configuration of the present embodiment.

Fourth Embodiment

Figure 11:
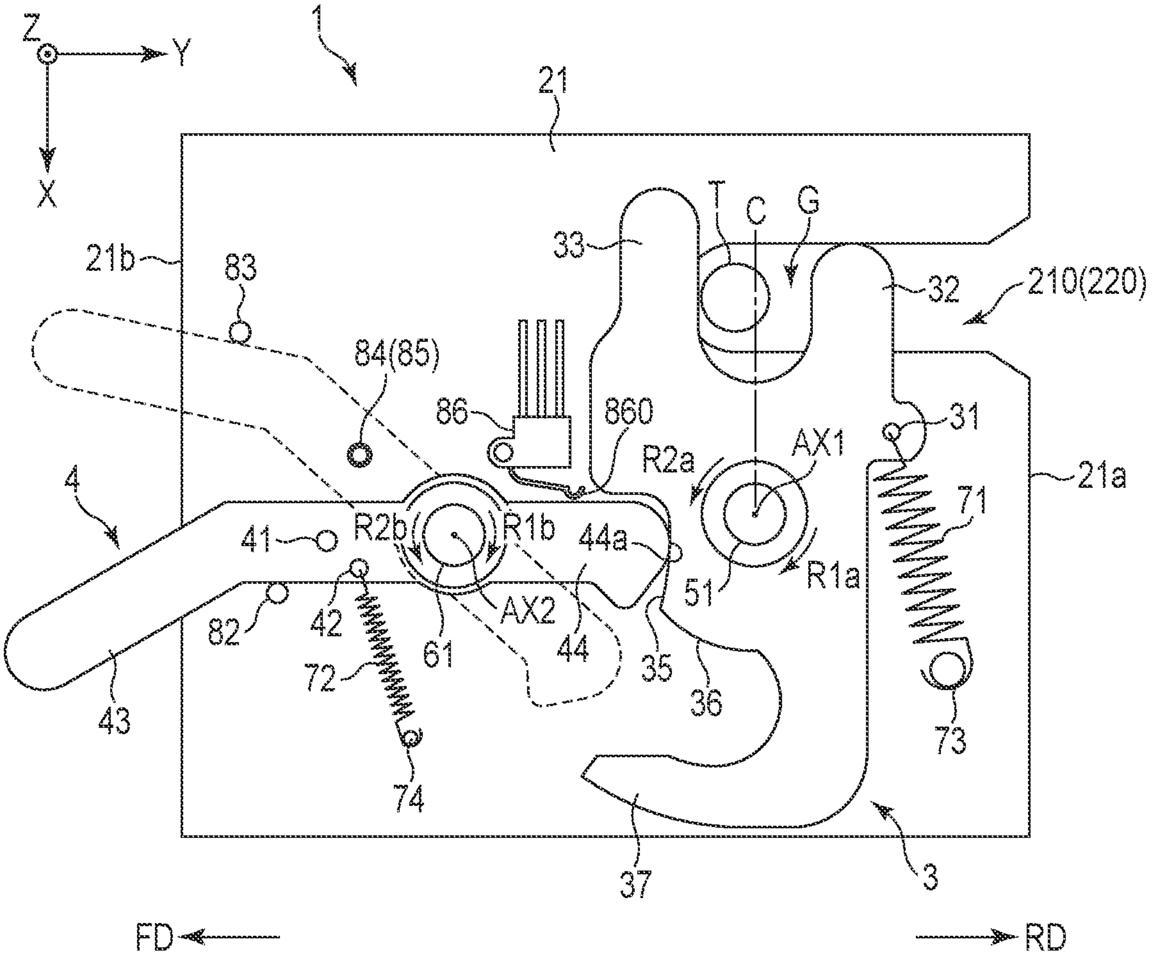
FIG. 11 is a schematic plan view showing a locking mechanism according to a fourth embodiment.

FIG. 11 is a schematic plan view showing a locking mechanism 1 of a fourth embodiment. In the locking mechanism 1 shown in this figure, a latching member 3 includes a connection hole 31, a hook 32, an actuation arm 33, a first receiving surface 35, and a second receiving surface 36 in the same manner as the first embodiment. In addition, a locking member 4 includes an engagement portion 41, a connection hole 42, a lever 43, and a regulation portion 44, in the same manner as the first embodiment. A role of each portion of the latching member 3 and the locking member 4 is the same as that in the first embodiment. In the example of FIG. 11, a center line C of a gap G overlaps with a first rotation axis AX1. In addition, a first elastic body 71 is a coil spring having a diameter larger than a second elastic body 72.

In FIG. 11, the latching member 3 is in an engagement position and engaged with an engaged member T. In addition, the locking member 4 is in a lock position, and a tip portion 44*a* of the regulation portion 44 is in contact with the first receiving surface 35. The locking member 4 can be rotated to an unlock position indicated by a broken line. In the same manner as the first embodiment, the latching member 3 does not interfere with the locking member 4 when the locking member 4 is rotated from the lock position to the unlock position. When the locking member 4 is in the unlock position, the latching member 3 can be rotated to an engagement release position.

The latching member 3 further includes a release arm 37 opposed to the second receiving surface 36 in a radial direction about the first rotation axis AX1. When the latching member 3 rotates from the engagement position to the engagement release position, the release arm 37 presses the regulation portion 44 of the locking member 4 in the unlock position. As a result, engagements between the engagement portion 41 and the plungers 84 and 85 are released, and the locking member 4 rotates toward a standby position in a second rotational direction R2*b*.

The same advantages as those of the first embodiment can also be obtained from the configuration of the present embodiment.

The first to fourth embodiments do not limit the scope of the present invention to the configurations disclosed in these embodiments. The present invention can be carried out by modifying the configuration disclosed in each of the embodiments into various aspects.

For example, shapes of the latching member 3 and the locking member 4 are not limited to those described in each embodiment, as long as the same effect as each embodiment is achieved.

The sensor 86 may detect the locking member 4 in the unlock position. In addition, the locking mechanism 1 may comprise a sensor detecting that the locking member 4 is in the lock position and a sensor detecting that the locking member 4 is in the unlock position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A locking mechanism for coupling a vessel to a trailer on which the boat is loaded, the locking mechanism comprising:

a base including a notch into which an engaged member is insertable;

a latching member including a hook and a first receiving surface, the latching member being rotatably coupled to the base about a first rotation axis; and a locking member including a lever and a regulation portion, the locking member being rotatably coupled to the base about a second rotation axis, wherein:

the latching member is rotatable between:

an engagement position in which the notch is partially closed by the hook and the engaged member inserted into the notch is surrounded by a wall surface of the notch and the hook; and an engagement release position in which closure of the notch by the hook is released, the locking member is rotatable between:

a lock position in which the regulation portion abuts on the first receiving surface of the latching member in the engagement position and a rotation of the latching member toward the engagement release position is regulated; and an unlock position in which the first receiving surface of the latching member in the engagement position and the regulation portion are spaced apart from each other, when the latching member is in the engagement position, the first receiving surface is an arcuate curved surface with the second rotation axis being a center, and when the locking member is rotated from the lock position toward the unlock position, the regulation portion does not interfere with the latching member.

2. The locking mechanism of claim 1, further comprising:

a first elastic body urging the latching member toward the engagement release position.

3. The locking mechanism of claim 2, wherein;

the latching member further includes an actuation arm opposed to the hook, when the latching member is in the engagement release position, the actuation arm partially closes the notch, and when the engaged member is inserted into the notch, the actuation arm is pressed by the engaged member to rotate the latching member toward the engagement position against an urging force of the first elastic body.

4. The locking mechanism of claim 1, further comprising:

a second elastic body urging the locking member toward the lock position.

5. The locking mechanism of claim 4, wherein;

the latching member further includes a second receiving surface against which the regulation portion is pressed by the urging force of the second elastic body when the latching member is in the engagement release position and the locking member is in the unlock position, and when the latching member rotates from the engagement release position toward the engagement position, the regulation portion slides the second receiving surface, and when the regulation portion finishes sliding the second receiving surface, the locking member is rotated to the lock position by the urging force of the second elastic body.

6. The locking mechanism of claim 4, further comprising:

a plunger attached to the base, wherein;

the locking member includes an engagement portion engaged with the plunger while being in the unlock position, and the rotation of the locking member toward the lock position by the urging force of the second elastic body is regulated by the plunger being engaged with the engagement portion.

7. The locking mechanism of claim 6, wherein:

the locking member further includes a release arm provided to be spaced from the regulation portion in a rotational direction of the locking member, the latching member further includes a protrusion located between the regulation portion and the release arm in the rotational direction of the latching member while being in the engagement position, and when the latching member rotates from the engagement position toward the engagement release position, the latching member rotates by the protrusion pressing the release arm, and the engagement between the plunger and the engagement portion is released.

* * * * *